April 2, 1940.  G. H. FRASER  2,195,410
CLUTCH FOR SPEED CHANGE AND OTHER GEARING
Original Filed Sept. 27, 1932
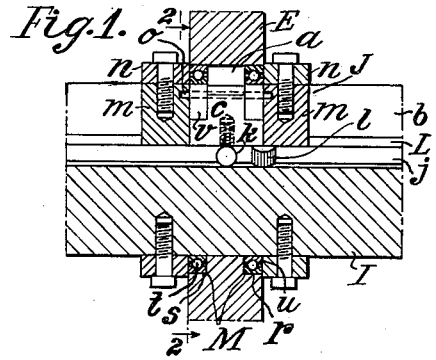
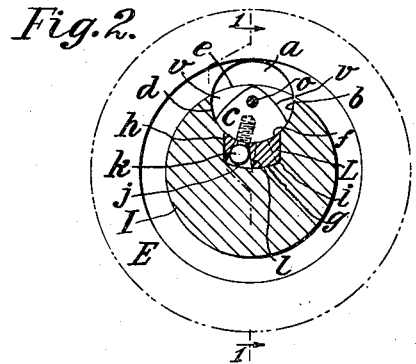
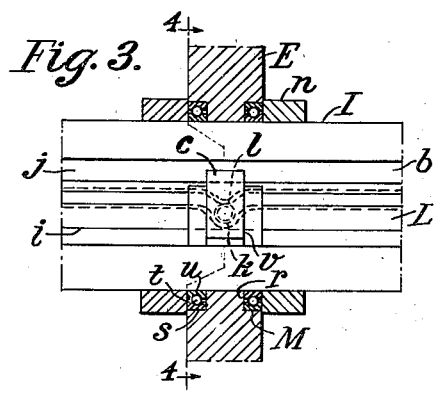
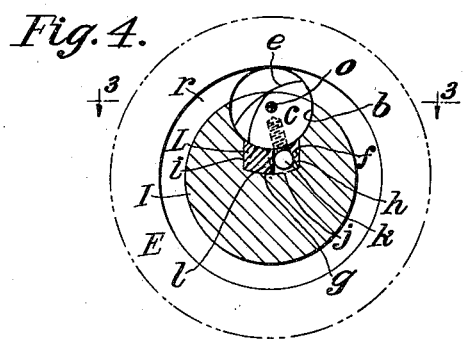
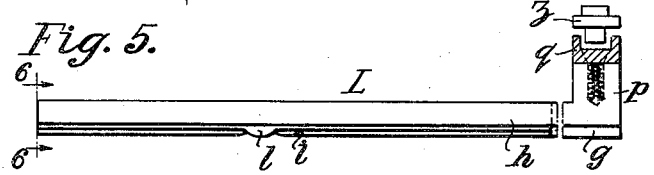
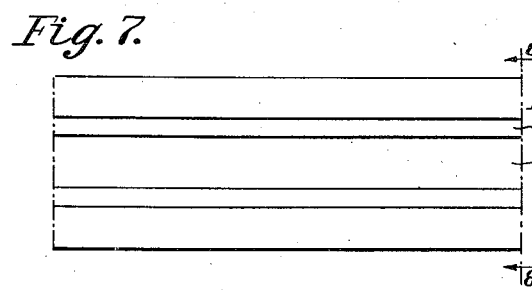
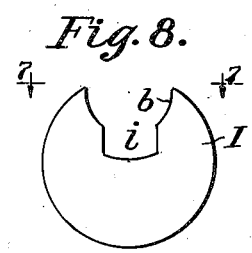
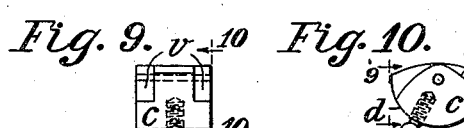
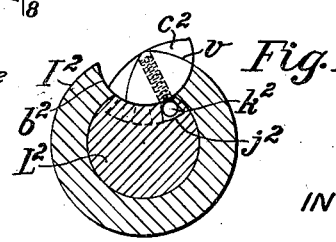
INVENTOR
George Holt Fraser Patented Apr. 2, 1940

2,195,410

UNITED STATES PATENT OFFICE 2,195,410

CLUTCH FOR SPEED CHANGE AND OTHER GEARING

George Holt Fraser, Brooklyn, N. Y.

Original application September 27, 1932, Serial No. 635,054. Divided and this application October 20, 1936, Serial No. 106,602. Renewed June 28, 1939

25 Claims. (Cl. 192—71)

This application is a division of my original application Serial No. 635,054, filed September 27, 1932.

This invention relates to clutches for transmitting rotary motion of a drive shaft, or part, to a driven shaft, or part, and aims to provide improvements in such devices.

My invention relates to clutches especially applicable to continuous mesh gears, and aims to improve operation and control of such clutches for facilitating drive engagement and disengagement.

To this end in carrying out the preferred form of my improvements as applied to drive or driven parts with semi-cylindrical axially extended keyways in their adjacent peripheries, I preferably provide an improved semi-cylindrical oscillatory key pivoted in one and oscillatory into the other of said keyways for drive engagement of said parts, and oscillatory out of said keyway for drive disengagement of said parts, one such key being preferably provided for each driven part; and I preferably provide an improved axially movable oscillator for said key, for holding it in drive disengagement position, and for oscillating it into drive engagement with said driven part; and I preferably provide various other features of improvement, all of which will be hereinafter more fully set forth in their preferred embodiment as a unitary clutch, with reference to the accompanying drawing, in which—

Fig. 1 is a fragmentary vertical section of a unitary clutch unit cut on the line 1—1 of Fig. 2 and looking in the direction of the arrows, showing the key in drive disengagement position;

Fig. 2 is a fragmentary vertical cross section thereof cut on the line 2—2 of Fig. 1 and looking in the direction of the arrows, showing the key in drive disengagement position;

Fig. 3 is a framentary horizontal section thereof cut approximately on the plane of the line 3—3 in Fig. 4 and looking in the direction of the arrows, showing the drive member and its keyseat, and the key and oscillator, in their clutched position;

Fig. 4 is a fragmentary cross section thereof cut approximately on the line 4—4 in Fig. 3 and looking in the direction of the arrows, showing the key in drive engagement position;

Fig. 5 is a fragmentary side elevation of the oscillator taken on the line 5—5 in Figs. 6 and looking in the direction of the arrows;

Fig. 6 is an end view of the oscillator taken on the line 6—6 in Fig. 5 and looking in the direction of the arrows;

Fig. 7 is a fragmentary plan view of the drive member or shaft showing its keyseat and slideway taken on the line 7—7 in Fig. 8 and looking in the direction of the arrows;

Fig. 8 is an end view thereof taken on the line 8—8 in Fig. 7 and looking in the direction of the arrows;

Fig. 9 is a side view of the key taken on the line 9—9 in Fig. 10 and looking in the direction of the arrows;

Fig. 10 is an end view of the key taken on the line 10—10 in Fig. 9 and looking in the direction of the arrows;

Fig. 11 is a fragmentary cross section showing a modification, and

Fig. 12 is a similar fragmentary cross section showing another modification.

Referring to Figs. 1 to 10 of the drawing, let I indicate a rotary shaft member, E a rotary gear or other member rotatably mounted thereon, J clutch means therebetween, and L a clutch control operator for operating the clutch J.

These parts may be of any usual or suitable construction or principle of operation for transmitting the rotation of a drive shaft or member to a driven part or member and for terminating such tansmission.

The shaft I is usually a rotary drive member, and the gear or part E is usually a rotatable driven member in operative relation to and adapted to be rotated by the drive member, one of said parts having a keyseat in which one member of the clutch J is oscillatorily mounted, and the other having a keyway reciprocal to said seat. The clutch means J usually comprises an oscillatory key c for drive engagement and disengagement of said members when the oscillator is moved axially to oscillate the key.

The shaft I is usually formed with a semi-cylindrical axially extended keyseat b, and the member E is usually formed with a semi-cylindrical keyway a reciprocal to and movable into coincidence with said keyseat, and the key c is usually formed with a semi-cylindrical transmission portion d oscillatorily fitted in the seat b, and with a flatter or convex portion e oscillatory into coincidence with the adjacent peripheries of the members I and E for terminating transmission, and oscillatory into the keyway a for drive engagement of said members. The oscillator L is usually slidable axially of the key c, and operable coincidently with such axial movement to oscillate the key into or out of its drive engagement position for controlling transmission.

According to the preferred form of my present invention as used with a semi-cylindrical oscillatory key having a round side in its keyseat and a flatter side oscillatory into and out of the keyway, I circumferentially oscillate the key from its round side and preferably from approximately diametrically opposite to its flatter side, and preferably from intermediate the longitudinal extension of the latter, and from within its keyseat; and I preferably dispose its oscillator at such round side and within its keyseat, and I preferably form its oscillator with an axially extended concave or hollow portion into which the round side of the key is extended and within which it is oscillatory transversely of the oscillator, for slidably positioning the oscillator from the round side of the key and utilizing the hollow side of the oscillator to peripherally embrace the round side of the key; and I preferably radially restrain the key from its round side and from within its keyseat; and preferably by a radial retention overhung connection between its round side and the hollow side of its oscillator adapted to radially, slidably, and oscillatorily connect these; and I preferably provide the key and oscillator the one with an oscillation projection and the other with an axially extended cam portion interengaged at the round side of the key for circumferentially oscillating it from its round periphery with movement of the oscillator axially of the key.

Any suitable means for oscillating the key may be employed, but preferably according to one feature of my invention I provide an improved axially slidable operator L, preferably having a particylindrical axially extended, concave wall $f$ fitting the key $c$, and a parti-cylindrical wall $g$ and flat sides $h$ slidably fitted in a groove $i$, which operator preferably has a flared or undercut overhung, or beveled, axially extended cam groove or slot $j$, engaging a preferably spherical or flared, or overhung, radial projection $k$, carried by the key, for retaining the latter radially in its shaft, and for oscillating the key. For this purpose the operator is preferably formed with a laterally extending cam portion $l$, which engages and preferably overhangs the sphere $k$, and oscillates the key when the operator L is slid into position for locking the key $c$, the rest of the slot $j$ holding the sphere $k$ and key $c$ in neutral position.

The operator L is preferably long enough so that the length of its slot $j$ may engage the sphere $k$ in all its positions, and this slot is preferably open at one end of the operator for permitting it to be slid over any key $c$ with which it is used, and the groove $i$ is preferably long enough to provide for the necessary travel of the operator L, which is preferably radially and slidably held in the groove by retainer lugs $m$ carried by collars $n$ at each side of the key $c$. These collars axially retain the gear E in position on its shaft to which these collars are fixed and with which they revolve. The lugs $m$ axially retain the key $c$ in position relatively to the gear E, so that the operator may slide axially of the gear and the key without axially displacing these.

The keyway $a$ in the gear is preferably an empty recess when the key $c$ is in the unlocked position, and affords a clear and unobstructed space for entrance of the key as it approaches coincidence with the latter.

Although the key $c$, when in an unclutched position, is restrained against centrifugal action when its keyseat $b$ exceeds half of its diameter, and is further restrained when its operating projection of pin $k$ overhangs the side walls of the slot $j$, I prefer to make the key $c$ tubular and to journal it oscillatorily on an axially extended retainer pin $o$, the ends of which are mounted in the retainer lugs or blocks $m$, around which pin the key is free to oscillate, and by which it is positioned and restrained from radial displacement, while free for movement and controlled by the operator L. The periphery of the pin $o$ is preferably located inwardly of the outer convex wall $e$ of the key, so that the pin and the hole through which it is passed may be cylindrical without exceeding the radius of this wall, thus keeping the pin within the inner periphery of the corresponding gear. When desired the pin $o$ alone may be relied on for resisting centrifugal displacement of its key.

The oscillator L may be moved in any desired manner, but when it is a bifurcated member as shown, I prefer to attach its solid end by a lug $p$ to a grooved ring $q$ slidably mounted around the keyseat $b$, and axially moved in any suitable manner, as from without it by the shifter $z$, or other axial movement provision, for shifting the operator and controlling or oscillating the key during revolution of the shaft within the gear mounted thereon whereby the speed of the driven shaft may be controlled or changed when operated under full load, or full torque, or at full or any speed.

When ball bearings are desired between the gear E and the shaft I, my invention preferably uses narrow axially spaced anti-frictional bearings M between these, preferably by forming each gear with an annular recess $r$ in which is pressed an annular female race member $s$, connected by anti-frictional rollers $t$ with an annular male race $u$ sustaining the gear from its shaft and encircling the ends of its oscillatory key $c$. These ends are preferably reduced opposite the race $u$ at $v$, to permit the key to oscillate, so that its intermediate portion may enter the keyway $a$ between the races, to then lock the gear to its shaft, so that the gear may be carried from its shaft by the spaced ball bearings, and may be locked to its shaft by oscillation of the intermediate portion of the key $c$ into engagement with the keyway $a$ intermediate of these ball bearings.

In operation the key $c$ is preferably passively, circumferentially oscillatory, and its cam portion $k$ will project radially inwardly from its cylindrical periphery and be axially slidingly embraced by the undercut walls of the cam groove $j$ of the oscillator, the axially sinuous cam faces $l$ of which will act tangentially of the circumferential peripheries of the key for peripherally oscillating it into and out of drive engagement position, and the overhung engagement between the projection $k$ and the slot $j$ will tensionally restrain key displacement by gravity or centrifugal or other force.

It will be understood that my invention is not limited to the particular details of construction, arrangement, use, or combination of parts, set forth and shown as embodying its preferred form, since it can be availed of in whole or in part according to such modifications of these as circumstances or the judgment of those skilled in the art may dictate, without departing from the spirit of the invention.

The operator L may be of any suitable cross-section other than the convex cross-section illustrated and may embrace more or less of the periphery of the key $c$ than shown, and its slideway $i$ may be of any suitable cross-section. If the operator is semi-circular and embraces the circumference of the key the keyseat will be correspondingly larger and the operator will constitute a lining wall between it and the key, as shown at I3, b3, L3, J3, k3, and c3 in Fig. 12, but I prefer to make the groove i flat sided and utilize its flat sides for resisting lateral pressure of the operator L.

If the main body of the oscillator L is cylindrical its jackshaft will be centrally bored to slidingly and retentively receive it, and the key c and keyseat b will be deep enough to intersect this bore, to permit a circumferentially oscillatory and radially retentive connection therein between the round side of the key and the hollow side of the oscillator, and to afford communication from the oscillator to without the periphery of the jackshaft, in which the oscillator may be axially shifted, as shown at I2, l2, b2, j2, k2, and c2, in Fig. 11.

What I claim is:

1. In a clutch, a rotary drive member, a rotatable driven member in operative relation to and adapted to be rotated by said drive member, one of said members having a keyseat and the other having a keyway cooperable with said keyseat, a circumferentially oscillatory key having a round side in said keyseat and having a flatter side oscillatory into and out of said keyway, for drive engagement and disengagement of said members, and an axially movable oscillator for oscillating said key, in combination with a circumferentially active oscillation connection between said key and said oscillator at the round side of said key, in circumferentially oscillatory operative relation to said round side of said key and adapted to circumferentially oscillate said key into and out of such engagement from the round side of said key.

2. In a clutch, a rotary drive member, a rotatable driven member in operative relation to and adapted to be rotated by said drive member, one of said members having a keyseat and the other having a keyway cooperable with said keyseat, a circumferentially oscillatory key having in the same transverse plane a round side in said keyseat and a flatter side oscillatory into and out of said keyway, for drive engagement and disengagement of said members, and an oscillator for circumferentially oscillating said key, in combination with a circumferentially active oscillation connection between said key and said oscillator disposed in said transverse plane and at and in circumferentially oscillatory relation to the round side of said key, and adapted to circumferentially oscillate said key from said oscillator into and out of such engagement from within said transverse plane.

3. In a clutch, a rotary drive member, a rotatable driven member in operative relation to and adapted to be rotated by said drive member, one of said members having a keyseat and the other having a keyway cooperable with said keyseat, a circumferentially oscillatory semi-cylindrical key having a round side in said keyseat and having a flatter side oscillatory into and out of said keyway, for drive connection and disconnection of said members, and a circumferential oscillator for said key, in combination with a circumferentially oscillatorily active connection between said key and said oscillator at and in circumferentially oscillatory relation to the round side of said key and intermediate the longitudinal extension of the latter, for circumferentially oscillating said key from said oscillator, transversely active in reverse directions, comprising an axially extended cam groove in one thereof transversely active in reverse directions, and a projection carried by the other thereof and extended into slidable engagement with and embraced by said groove, said groove and projection constructed and arranged to in response to axial movement of said oscillator oscillate said key in one direction for effecting said drive connection, and in the reverse direction for terminating said drive connection.

4. In a clutch, a rotary drive member, a rotatable driven member in operative relation to and adapted to be rotated by said drive member, one of said members having a keyseat and the other a keyway cooperable with said keyseat, a semi-cylindrical oscillatory key having a semi-cylindrical side in said keyseat and a flatter side oscillatory into and out of said keyway, for drive engagement and disengagement of said members, and an oscillator for oscillating said key, in combination with a circumferentially oscillatorily active oscillation connection between said key and said oscillator at the semi-cylindrical side of said key and within the longitudinal extension of said flatter side, in circumferentially active operative relation to said semi-cylindrical side and adapted to circumferentially oscillate said key into and out of such engagement from its semi-cylindrical side and from intermediate such extension.

5. In a clutch, a rotary drive member, a rotatable driven member in operative relation to and adapted to be rotated by said drive member, one of said members having a keyseat and the other having a keyway cooperable with said keyseat, a circumferentially oscillatory semi-cylindrical key having a round side in said keyseat and a flatter side oscillatory into and out of said keyway, for drive connection and disconnection of said members, and an axially movable oscillator for said key, in combination with an oscillation connection between said key and said oscillator and within said keyseat, at and in circumferentially active oscillatory relation to the round side of said key, and adapted to circumferentially oscillate said key into and out of such engagement from within said keyseat and from said round side with axial movement of said oscillator.

6. In a clutch, a rotary drive member, a rotatable driven member in operative relation to and adapted to be rotated by said drive member, one of said members having a keyseat and the other having a keyway cooperable with said keyseat, and a circumferentially oscillatory semi-cylindrical key having a round side in said keyseat and having a flatter side oscillatory into and out of said keyway, for drive engagement and disengagement of said members, in combination with an axially movable oscillator for said key within and axially movable within said keyseat and inwardly of and in circumferentially active operative relation to the round side of said key within said keyseat and adapted when axially moved to circumferentially oscillate said key from within said keyseat.

7. In a clutch, a rotary drive member, a rotatable driven member in operative relation to and adapted to be rotated by said drive member, one of said members having a keyseat and the other having a keyway cooperable with said keyseat, an oscillatory key having an inner portion in said keyseat and having an outer portion oscillatory into and out of said keyway, for drive engagement and disengagement of said members, in combination with an axially movable oscillator inwardly of said keyseat and movable axially of said key, for oscillating said key, said key and oscillator having the one an axially extended sinuous cam portion transversely active in reverse directions, and the other a cam projection in operative relation to and slidably overhung by said cam portion, said portion and projection adapted to oscillate said key in two directions for oscillating said key from inwardly of said keyseat into and out of such engagement with axial movement of said oscillator.

8. In a clutch, a rotary drive member, a rotatable driven member in operative relation to and adapted to be rotated by said drive member, one of said members having a keyseat and the other having a keyway cooperable with said keyseat, and a passively oscillatory semi-cylindrical key having a semi-cylindrical side in said keyseat and having a flatter side oscillatory into and out of said keyway, for drive engagement and disengagement of said members, in combination with a positive circumferential oscillator for said key inwardly of and in operative relation to the semi-cylindrical side of said key and movable axially of said keyseat for oscillating said key, and constructed and arranged to positively circumferentially oscillate said key into and out of such engagement with such movement.

9. In a clutch, a rotary drive member, a rotatable driven member in operative relation to and adapted to be rotated by said drive member, one of said members having a keyseat and the other having a keyway cooperable with said keyseat, a circumferentially oscillatory key having a round side in said keyseat and a flatter side oscillatory into and out of said keyway, for drive engagement and disengagement of said members, in combination with an axially movable oscillator for said key inwardly of said keyseat, and having a concave face fitting against and slidable axially of the round side of said key, and a circumferential oscillation connection between said key and said oscillator within said concave face, and adapted to circumferentially oscillate said key with axial movement of said oscillator.

10. In a clutch, a rotary drive member, a rotatable driven member in operative relation to and adapted to be rotated by said drive member, one of said members having a keyseat and the other having a keyway cooperable with said keyseat, and a semi-cylindrical oscillatory key having a round side in said keyseat and a flatter side oscillatory into and out of said keyway, for drive engagement and disengagement of said members, in combination with an axially movable oscillator inwardly of said round side and movable axially thereof and of said key for oscillating said key, said key and said oscillator having the one an axially extended cam face and the other a cam projection at the side of and in axially slidable and circumferentially oscillatory operative relation to said face, and adapted to circumferentially oscillate said key from said round side with axial movement of said oscillator.

11. In a clutch, a rotary drive member, a rotatable driven member in operative relation to and adapted to be rotated by said drive member, one of said members having a keyseat having an internal recess, and the other having a keyway cooperable with said keyseat, a semi-cylindrical circumferentially oscillatory key having a round side in said seat and a flatter side oscillatory into and out of said keyway, for drive engagement and disengagement of said members, and an axially movable oscillator movable axially of said key for oscillating said key, the combination therewith of an oscillation projection carried by and extended beyond the round side of said key and extended therefrom into and circumferentially oscillatory in said recess, and a cam face within said recess and at the round side of said key and at the side of said projection and carried by and axially movable with said oscillator, and in circumferentially oscillatory relation to said projection, and adapted to circumferentially oscillate said key from within said recess with axial movement of said oscillator.

12. In a clutch, a rotary drive member, a rotatable driven member in operative relation to and adapted to be rotated by said drive member, one of said members having a keyseat having an internal slideway, and the other having a keyway reciprocal to said keyseat, and a semi-cylindrical circumferentially oscillatory key having a round side in said keyseat and a flatter side oscillatory into and out of said keyway, for drive engagement and disengagement of said members, in combination with an axially movable oscillator within said slideway, movable axially of said key and axially slidable within said slideway, said key and said oscillator having within said slideway the one an oscillation projection and the other an axially extended groove entered by and in axially slidable engagement with said projection and adapted to circumferentially oscillate said key transversely of said slideway with axial movement of said oscillator.

13. In a clutch, a rotary drive member, a rotatable driven member in operative relation to and adapted to be rotated by said drive member, one of said parts having a keyseat and the other having a keyway cooperable with said keyseat, a circumferentially oscillatory semi-cylindrical key having a round side in said keyseat and having a flatter side oscillatory into and out of said keyway, for drive engagement and disengagement of said members, and oscillation means in operative relation to said key for oscillating said key, in combination with radial retention means for said key inwardly of said keyseat, for radially retaining said key therein, comprising circumferentially movably engaged overhung and undercut provisions carried by said keyseat and said key and overhangingly engaged inwardly of said keyseat and adapted to overhangingly circumferentially movably and radially hold said key in said keyseat from inwardly of the latter.

14. In a clutch, a rotary drive member, a rotatable driven member in operative relation to and adapted to be rotated by said drive member, one of said members having a keyseat and an axial slideway in communication with said keyseat and the other having a keyway cooperable with said keyseat, a semi-cylindrical circumferentially oscillatory key having a round portion in said keyseat and a flatter portion oscillatory into and out of said keyway, for drive connection and disconnection of said members, and an axially slidable oscillator in said slideway and slidable axially of said key and in operative relation thereto for circumferentially oscillating said key, in combination with radial retention connection means between said key and said oscillator comprising overhung circumferentially oscillatorily interengaged provisions carried by said key and said oscillator in radially retentive overhung relation within said slideway, for radially connecting, and axially and circumferentially movably connecting, said key and said oscillator from within said slideway.

15. In a clutch, a rotary drive member, a rotatable driven member in operative relation to and adapted to be rotated by said drive member, one of said members having a key seat and an axially extended slideway in communication with said keyseat, and the other having a keyway cooperable with said keyseat, a semi-cylindrical circumferentially oscillatory key having a round portion in said keyseat and extended into said slideway and having a flatter portion oscillatory into and out of said keyway, for drive connection and disconnection of said members, in combination with an axially slidable oscillator in said slideway and slidable axially of said key, having an axially extended concave face at and circumferentially oscillatorily entered by the round side of said key, for permitting circumferential oscillation of said key transversely of said concave face, said key and said oscillator having interengaged circumferential oscillation provisions between the round side of said key and the concave face of said oscillator, adapted to oscillate said key transversely of said oscillator with axial movement of the latter.

16. In a clutch, a rotary drive member, a rotatable driven member in operative relation to and adapted to be rotated by said drive member, one of said members having a keyseat and an axially extended slideway in communication with said keyseat and the other having a keyway cooperable with said keyseat, and a semi-cylindrical circumferentially oscillatory key having a round portion in said keyseat and extended within said slideway and having a flatter portion oscillatory into and out of said keyway, for drive connection and disconnection of said members, in combination with an axially movable oscillator in and slidable axially of said slideway and axially of said key, having a hollowed side adjacent and entered by the round side of said key and across which said round side is circumferentially oscillatory, said key and oscillator having at said hollow side, the one a cam provision and the other an oscillation projection in operative relation to said cam provision, and adapted to circumferentially oscillate said key from within said hollow side with axial movement of said oscillator.

17. In a clutch, a rotary drive member, a rotatable driven member in operative relation to and adapted to be rotated by said drive member, one of said members having a keyseat and a recess in communication with said keyseat, and the other having a keyway cooperable with said keyseat, a semi-cylindrical circumferentially oscillatory key having a round portion in said keyseat and circumferentially oscillatory within said recess and having a flatter portion oscillatory into and out of said keyway, for drive connection and disconnection of said members, and an axially slidable oscillator in said recess and slidable axially of said key for oscillating said key, said oscillator having a concave face slidably fitted against the round side of said key and within which said key is circumferentially oscillatory, and circumferentially oscillatory interengaged overhung cam provisions between said key and said oscillator adapted to circumferentially oscillate said key transversely of said oscillator with axial movement of the latter and overhung for radially connecting said key and said oscillator during such oscillation.

18. In a clutch, a rotary drive member, a rotatable driven member in operative relation to and adapted to be rotated by said drive member, one of said members having a keyseat and a slideway extended axially of and in communication with said keyseat and the other having a keyway cooperable with said keyseat, a semi-cylindrical circumferentially oscillatory key having a round portion in said keyseat and oscillatory within said slideway and having a flatter portion oscillatory into and out of said keyway, for drive connection and disconnection of said members, an axially slidable oscillator slidable in said slideway and axially of said key and in operative relation to the latter for circumferentially oscillating said key, radially retentive means for radially retaining said oscillator in said slideway, and overhangingly interengaged radially retentive oscillation provisions between said key and said oscillator adapted to circumferentially oscillate said key transversely of said oscillator with movement of the latter axially of the key and to radially retain said key in said keyseat during such oscillation.

19. In a clutch, a rotary drive member, a rotatable driven member in operative relation to and adapted to be rotated by said drive member, one of said members having a keyseat and a slideway in communication and extended axially of said keyseat, and the other having a keyway cooperable with said keyseat, a semi-cylindrical circumferentially oscillatory key having a round portion in said keyseat and oscillatory into said slideway, and having a flatter portion oscillatory into and out of said keyway, for drive connection and disconnection of said members, and a slidable oscillator in said slideway and slidable axially of said key for oscillating said key and in operative relation thereto for circumferentially oscillating said key, said key and said oscillator having the one an undercut axially extended cam groove and the other a projection entered within and in axially slidable engagement with said groove, said groove and projection in operative relation and adapted to circumferentially oscillate said key with movement of said oscillator axially of said key.

20. In a clutch, a rotary drive member, a rotatable driven member in operative relation to and adapted to be rotated by said drive member, one of said members having a keyseat and the other having a keyway cooperable with said keyseat, a semi-cylindrical circumferentially oscillatory key having a round portion in said keyseat and a flatter portion oscillatory into and out of said keyway, for drive connection and disconnection of said members, and an axially slidable oscillator slidable axially of and in operative relation to said key for circumferentially oscillating the key, said key and oscillator having the one a cam groove in operative relation to and extended axially of the round side of said key, and the other a flared radially extended projection extended into and slidably engaged by said cam groove, adapted to circumferentially oscillate said key transversely of said oscillator with axial movement of the latter, said projection being undercut for facilitating such oscillation.

21. In a clutch according to claim 4, said key having the flatter side extended throughout its axial length, and having an oscillation projection extended from and beyond the periphery of its semi-cylindrical side.

22. In a clutch according to claim 4, the oscillation provision of the key being radially extended from and beyond its semi-cylindrical periphery.

23. In a clutch according to claim 4, the flatter side of the semi-cylindrical key having a cutaway portion extended inwardly from the periphery of the keyseated member a distance equal to the oscillation of the key, for oscillating inwardly of such periphery during oscillation of the key.

24. In a clutch according to claim 12, the keyseated member having a cylindrical bore constituting the slideway, and the oscillator having a semi-cylindrical periphery axially slidably fitted in said bore, and having an axially extended side adjacent and in circumferentially oscillatory operative relation to the round side of the key.

25. In a clutch according to claim 10, the cam projection having a hemi-spherical periphery at the side of and in operative relation to the cam face.

GEORGE HOLT FRASER.